United States Patent Office 3,446,794
Patented May 27, 1969

3,446,794
CELLULOSE DERIVATIVES
Colin Sutherland Knight, Alexander Claude Reimer, and Victor Charles Weaver, Maidstone, Kent, and Brian Neville Brook, Faversham, Kent, England, assignors to W. & R. Balston Limited, Maidstone, Kent, England, a British company
No Drawing. Filed Oct. 20, 1964, Ser. No. 405,281
Claims priority, application Great Britain, Oct. 21, 1963, 41,543/63
Int. Cl. C08b 15/00
U.S. Cl. 260—212                    15 Claims

ABSTRACT OF THE DISCLOSURE

The preparation of microcrystalline cellulose ion exchange materials comprising the steps of (a) acid treating fibrous cellulose to remove its amorphous regions, (b) mercerizing the resulting microcrystalline cellulose, (c) crosslinking the mercerized product with a substance such as epichlorohydrin, and (d) reacting the resulting cross linked product with an ion exchange substituent such as 1, 3 propane sultone.

---

This invention relates to cellulose derivatives, and in particular to such derivatives having ion-exchange properties.

It is known to make ion-exchange celluloses from cellulose, particularly fibrous cellulose. However, such products possess certain disadvantages, such as they are difficult to pack as uniform columns, wherein ion-exchanges processes may be effected.

It is further known that in its fibrous state cellulose offers a molecular structure which consists of aggregates of molecular chains in various states of order and disorder within and between which are located holes or pores of widely differing size. The introduction of ion-exchange groups into such a structure occurs preferentially in certain regions and the distribution of these ionic groups, particularly in low capacity derivatives, tends to be non-uniform. We have discovered that by eliminating the amorphous regions of the cellulose and thus reducing the spread of molecular pore size distribution ionic substitution can be carried out more uniformly, particularly when substitution is confined to the surface of the cellulose crystallites themselves.

An object of this invention is to provide an improved cellulosic ion-exchange material, and a process for preparing such material.

According to the present invention there is provided a process for preparing a cellulosic ion-exchange material which process comprises the steps of:

(a) Treating a cellulosic material with acid to remove the amorphous regions of the cellulose
(b) Mercerising the resulting acid-degraded product
(c) Cross-linking the mercerised product, and
(d) Reacting the treated cross-linked product with a reagent to form the desired cellulosic ion-exchange material. Acid degradation, mercerising and reaction of cellulosic materials to form ion exchange materials have all been previously described, and no novelty is claimed for these separate steps per se. Step (a) may be effected by treating the cellulosic mraterial with an acid at a concentration up to 6 N at a temperature of from 40° C. to 120° C.; step (b) may be effected by treating the acid-degraded product with an alkali solution having a concentration of from 17% w./w. to 46% w./w.; step (c) may be effected by treating the mercerised product with epichlorhydrin, optionally in water at a concentration of at least 3% by weight; the cross-linked product may be treated with an alkali solution having a concentration of from 3% w./w. to 46% w./w. prior to step (d). The initial cellulosic material is preferably cotton linters. The amorphous regions of this material may be removed by boiling it with NHCl. The fibrous character of the starting material is thereby destroyed and at this stage the cellulose may be described as being in a micro crystalline state.

The acid degraded cellulose is preferably mercerised in 8% w./w. sodium hydroxide solution. The primary function of this step is to make available the micro crystalline surfaces for subsequent chemical reaction. Excess alkali is removed from the cellulose by such means as centrifugal action.

A commonly used reaction medium for step (d) is water but in the case of certain derivatives a more uniform product is obtained by the use of a organic reaction medium, for example isopropyl alcohol or benzene. Sulpethyoxycellulose is an example of a derivative which can only be prepared in a satisfactory manner by using a reaction medium such as isopropyl alcohol. Carboxymethylcellulose can be prepared successfully in water but an improved product may be obtained by the use of isopropyl alcohol as a reaction medium. The function of the isopropyl alcohol in these instances may be to control the swelling of the cellulose derivative and by so doing to promote a more uniform dispersion of ionisable groups throughout the cellulose structure. Comparative experiments carried out on carboxymethylcellulose prepared in water and in isopropyl alcohol have demonstrated the greater uniformity of the latter preparation. The final product may be dried, after washing, at a temperature of, for example, 60° C. It is a consequence of drying the ion-exchange product that hydrogen bonding between the substituted micro crystallities will occur. In order to realise an increased capacity of the material for ion-exchange purposes it is useful to pretreat the product with normal acid and alkali prior to use. However, such treatment is not so effective as keeping the cellulose and the ion-exchange cellulose moist or wet at all times subsequent to an acid degradation or like step.

A large number of reagents is known to the art which will react with a cellulosic material to give ion-exchange products. Mention may be made of sodium chloroacetate for preparing carboxy methyl cellulose, of chloroethyldiethyl ammonium hydrochloride for preparing diethylaminoethyl cellulose, and of 1,3-propanesultone for preparing sulphpropoxycellulose. But the nature of the reagent for step (d) of the process of this invention is in no way critical, and any reagent which can be made to react with cellulosic materials to give ion-exchange products may be used.

According to one form of the invention there are also introduced into the matrix of the cellulosic material non-ionic substituent groups capable of inducing selective interaction effects in a reversible exchange of ions in aqueous solution between the thus modified cellulose matrix and an exchanging ion. Examples of such non-ionic substituent groups are benzyl, methyl, acetyl and stearyl, but again a large range of groups will be apparent to the expert in the field, and this invention is not limited to any particular range of groups. Benzyl groups may be introduced into the cellulose matrix for instance by reacting benzyl chloride with the cellulosic ion-exchange material from step (d), or with the mercerized product from step (b). Other single reactants may be used instead of benzyl and the ionic groups, for example sodium benzylchloride p-sulphonate, sodium benzylchloride p-carboxylate or p-trimethyl ammonium benzylchloride chloride.

We have found that the ion-exchange celluloses derived from acid degraded cellulose are more uniform in their ion-exchange performance, which is a consequence of the more uniform nature of the starting material itself. It also becomes possible to exercise greater control of the characteristics of the final product, for example, by choosing suitable reaction conditions. Ionisable groups may be concentrated on the surface of the micro crystals themselves in a more or less uniform manner. This has particular advantages when the product is to be used under chromatographic conditions where only surface groups are used and whence there is avoided a wastage of ion-exchange capacity in inaccessible regions.

Products covering a wide range of ion-exchange capacities can be prepared by the above methods. In order to retain the advantages of the crystalline cellulose structure, however, it has been observed that the ion-exchange capacities of the derivatives in accordance with this invention preferably are of 1 meq./dry g. or less. With ion-exchange capacities in excess of 1 or 2 meq./dry g. there is a noticeable onset of gel-like characteristics in the final product. These are manifested in slower kinetics of exchange and lower accessibility relative to the lower capacity products.

In the case of products of higher capacity, the characteristic cellulose structure is progressively destroyed as the ion exchange groups are caused to penetrate further and further into the cellulose micro crystals themselves. The accessibility of the ion exchange sites in high capacity products is thereby reduced. This does not, however, detract from other advantages of such products, for example those associated with the crystalline physical form and the higher selectivity of such products.

It is to be understood further that our invention is not restricted to cellulose derivatives having substitution at or near the surface of the crystallites as there can also be provided products of high ion-exchange capacity, e.g., >4 meq./dry g., in which the characteristic molecular structure of the cellulose has been destroyed but our products retain the advantages associated with the crystalline physical form of the product.

Following is a description by way of example of processes in accordance with the invention.

EXAMPLE I

Preparation of sulphpropoxycellulose

Cotton linters (10 kg.) was boiled with N hydrochloric acid (165 l.), with stirring, under reflux for 1 hour.

The product was then washed with demineralised water until the wash water was neutral in pH. It was then freed of excess water by centrifuging.

The wet cellulose powder (400 g.; 50% moisture) was mixed with water (900 ml.) and this slurry was added to 46% w./w. sodium hydroxide solution (1.41 kg.) at room temperature with stirring. Water (1.09 l.) was then added and the slurry was stirred. The suspension was then filtered in a centrifuge until virtually no more alkali was extracted. The resultant alkali cellulose was removed and weighed (800±5 g.).

The alkali cellulose was stirred and boiled for 2 hours under reflux with water (1.4 l.) and epichlorhydrin (400 ml.).

The product (epichlorhydrin cellulose) was washed with demineralized water until the wash water was alkali free and finally the excess water was removed by centrifuging.

The wet epichlorhydrin cellulose (800 g.; 75% moisture) was mixed with water (1.59 l.) and the slurry was added to 46% w./w. sodium hydroxide solution (1.41 kg.) with stirring. The suspension was filtered in a centrifuge until virtually no more alkali was extracted. The resultant alkali epichlorhydrin cellulose was removed and weighed (800±5 g.).

The alkali epichlorhydrin cellulose was stirred and boiled under reflux with 1,3-propanesultone (140 g.) suspended in propan-2-ol (2 l.) for 4 hours.

The product was washed with demineralised water until the wash water was free of alkali.

The ion-exchange capacity of the product was 1 meq./g. of the sodium form.

Examples II, III and IV describe the preparation of carboxymethylcellulose.

EXAMPLE II

Alkali epichlorhydrin cellulose (800 g.), as prepared in Example I, was stirred and boiled under reflux with sodium chloroacetate (69 g.) suspended in propan-2-ol (2 l.) for 4 hours.

The product was washed with demineralised water until the wash water was free of alkali.

The ion-exchange capacity of the product was 1 meq./g. of the sodium form.

EXAMPLE III

Alkali epichlorhydrin cellulose (800 g.), as prepared in Example I, was stirred and boiled under reflux with sodium chloroacetate (20 g.) suspended in propan-2-ol (2 l.) for 4 hours.

The product was washed with demineralised water until the wash water was free of alkali.

The ion-exchange capacity of the product was 0.25 meq./g. of the sodium form.

EXAMPLE IV

Alkali epichlorhydrin cellulose (800 g.), as prepared in Example I, was stirred and boiled under reflux with sodium chloroacetate (480 g.) suspended in propan-2-ol (2 l.) for 4 hours.

The product was washed with demineralised water until the wash water was free of acid.

The ion-exchange capacity of the product was 4.5 meq./g. of the sodium form.

Examples V, VI and VII describe the preparation of diethylaminoethylcellulose.

EXAMPLE V

Alkali epichlorhydrin cellulose (800 g.), as prepared in Example I, was stirred and heated under reflux at 60° with a solution of chloroethyldiethylammonium hydrochloride (173 g.) in water (1.6 l.) for 1½ hours.

The product was washed with demineralised water until free of alkali.

The ion-exchange capacity of the product was 1 meq./g.

EXAMPLE VI

Alkali epichlorhydrin cellulose (800 g.), as prepared in Example I, was stirred and heated under reflux at 60° with a solution of chloroethyldiethylammonium hydrochloride (42 g.) in water (1.6 l.) for 1½ hours.

The product was washed with demineralised water until free of alkali.

The ion-exchange capacity of the product was 0.25 meq./g.

EXAMPLE VII

The wet epichlorhydrin cellulose (80 g.; 75% moisture) as prepared in Example I, was stirred with 46% w./w. sodium hydroxide solution (400 g.). The suspension was filtered in a centrifuge until virtually no more alkali was extracted. The resultant alkali epichlorhydrin cellulose was removed and weighed (120 g.).

The alkali epichlorhydrin cellulose was stirred and boiled under reflux with a suspension of chloroethyl-diethylammonium hydrochloride (120 g.) in benzene (200 ml.) for 4 hours.

The product was washed with alcohol, followed by demineralised water until the product was free of alkali.

The ion-exchange capacity of the product was 4.0 meq./g.

EXAMPLE VIII

Preparation of a sulphpropoxy benzylcellulose

The wet sulphpropoxycellulose (25 g. wet; 5 g. dry), as prepared in Example I, was mixed with water (34.8 ml.) and the mixture was poured into 46% w./w. sodium hydroxide (23.6 ml; 35.3 g.). The slurry was filtered giving alkali sulphpropoxycellulose (26 g.). The alkali sulphpropoxycellulose was heated under reflux with benzylchloride (50 ml.) at 80° for 4 hours.

The product was washed with acetone, benzene, acetone, and then water to neutrality.

The ion-exchange capacity of the product was 0.7 meq./g. of the sodium form and the benzyl content was 38.6%.

EXAMPLE IX

Preparation of a carboxymethyl benzylcellulose

Alkali cellulose (400 g.), as prepared in Example I, was stirred and heated under reflux with benzylchloride (1 l.) at 80° for 4 hours.

The product was washed with acetone (2× 1 l.), benzene (2× 1 l.), acetone (1 l.), and then water to neutrality.

The benzyl content of the product was 30.8%.

Wet benzyl cellulose (30.3 g. wet; 7.5 g. dry) was mixed with water (59.4 ml.) and 46% w./w. sodium hydroxide (35.4 ml.; 52.9 g.) was added. The slurry was filtered giving alkali benzyl cellulose (39 g.). The alkali benzyl cellulose was boiled under reflux for 2 hours with epichlorhydrin (15 ml.) and water (53.5 ml.).

The product was washed with water.

The epichlorhydrin benzyl cellulose (4.5 g. dry) was mixed with water (49.2 ml.) the 46% w./w. sodium hydroxide (21.3 ml.) was added. The slurry was filtered giving alkali epichlorhydrin benzyl cellulose (20.5 g.). The alkali epichlorhydrin benzyl cellulose was boiled for 4 hours under reflux with sodium chloroacetate (1.6 g.) in propan-2-ol (45 ml.).

The product was washed with water until the wash water was neutral.

The ion-exchange capacity of the product was 0.77 meq./g. of the sodium form and the benzyl content was 24.5%.

Examples X and XI describe the preparation of diethylaminoethyl benzyl cellulose.

EXAMPLE X

The epichlorhydrin benzyl cellulose (4.5 g. dry), as prepared in Example IX, was mixed with water (49.2 ml.) then 46% w./w. sodium hydroxide (21.3 ml.; 31.8 g.) was added. The slurry was filtered giving alkali epichlorhydrin benzyl cellulose (21.5 g.). The alkali epichlorhydrin benzyl cellulose was boiled under reflux for 2 hours with chloroethyl-diethylammonium hydrochloride (4.5 g.) in benzene (45 ml.).

The product was washed with water until it was neutral.

The ion-exchange capacity of the product was 0.5 meq./g. and the benzyl content was 25.6%.

EXAMPLE XI

Epichlorhydrin cellulose (32.25 g. wet; 7.5 g. dry), as prepared in Example I, was mixed with water (57.5 ml.) and the suspension was poured with stirring into 46% w./w. sodium hydroxide (35.4 ml.; 52.9 g.). The mixture was filtered giving alkali epichlorhydrin cellulose (50 g.). The alkali epichlorhydrin cellulose was heated under reflux with benzylchloride (75 ml.) at 80° for 4 hours.

The product was washed with acetone, benzene, acetone and then water to neutrality.

Some wet benzylated epichlorhydrin cellulose (11.1 g. wet; 5 g. dry) was mixed with water (48.7 ml.) and 46% w./w. sodium hydroxide (23.6 ml.; 35.3 g.) was added. The slurry was filtered giving alkali benzylated epichlorhydrin cellulose (13 g.). The alkali benzylated epichlorhydrin cellulose was boiled under reflux for 2 hours with chloroethyl-diethylammonium hydrochloride (5 g.) in benzene (50 ml.).

The product was washed with water to neutrality.

The ion-exchange capacity of the product was 1.42 meq./g. and the benzyl content was 22.3%.

EXAMPLE XII

Preparation of quaternaryammonium benzyl cellulose

Wet benzyl cellulose (20.2 g. wet; 5 g. dry), as prepared in Example I, was mixed with water (39.6 ml.) and 46% w./w. sodium hydroxide (23.6 ml.; 35.3 g.) was added. The slurry was filtered giving alkali benzyl cellulose (25 g.). The alkali benzyl cellulose was boiled under reflux with epichlorhydrin (12 ml.), triethylamine (15 ml.), and propan 2-ol (23 ml.) for 2 hours.

The product was washed with water, N/2 HCl, and water until it was neutral.

The ion-exchange capacity of the product was 0.78 meq./g. of the chloride form and the benzyl content was 22.6%.

In Examples XIII and XIV the optional second alkali treatment is omitted, and steps (c) and (d) are effected simultaneously.

EXAMPLE XIII

Preparation of a quaternaryammonium cellulose

Alkali cellulose (800 g.), as prepared in Example I, was stirred and boiled under reflux with epichlorhydrin (488 ml.), triethylamine (592 ml.), and propan-2-ol (920 ml.) for 2 hours.

The product was washed with demineralised water, followed by 0.5 N hydrochloric acid (2 l.) and finally with demineralised water until the wash water was free of acid.

The ion-exchange capacity of the product was 1 meq./g. of the chloride form.

EXAMPLE XIV

Preparation of a quaternaryammonium benzylcellulose

Wet quaternaryammonium cellulose (15.35 g. wet; 5 g. dry), as prepared in Example XIII, was mixed with water (44.45 ml.) and 46% w./w. sodium hydroxide (23.6 ml.; 35.3 g.) was added. The slurry was filtered giving alkali quaternary ammonium cellulose (17.5 g.) This alkali quaternary ammonium cellulose was heated under reflux with benzylchloride (50 ml.) at 80° for 4 hours.

The product was washed with acetone, benzene, acetone, and finally water until it was neutral.

The ion-exchange capacity of the product was 0.63 meq./g. of the chloride form and the benzyl content was 34.6%.

We claim:

1. A process for preparing a cellulosic ion-exchange material which process comprises the steps of:
    (a) treating a cellulosic material with acid to remove the amorphous regions of the cellulose and thereby provide a micro-crystalline cellulose,
    (b) mercerising the resulting micro-crystalline cellulose,
    (c) cross-linking the mercerised product, and
    (d) reacting the treated cross-linked product with a reagent to form the desired cellulosic ion-exchange material.

2. A process as claimed in claim 1 wherein step (a) is effected by treating the cellulosic material with an acid at a concentration up to 6 N at a temperature of from 40° C. to 120° C.

3. A process as claimed in claim 1 wherein step (b) is effected by treating the micro-crystalline cellulose with an alkali solution having a concentration of from 17% w./w. to 46% w./w.

4. A process as claimed in claim 1 wherein step (c) is effected by treating the mercerised product with epichlorhydrin.

5. A process as claimed in claim 1 wherein the cross-linked product is treated with an alkali solution having a concentration of from 3% w./w. to 46% w./w. prior to step (d).

6. A process as claimed in claim 1 wherein the cellulosic material is cotton linters.

7. A process as claimed in claim 1 wherein step (d) is effected in an aqueous reaction medium.

8. A process as claimed in claim 1 wherein step (d) is effected in an organic reaction medium.

9. A process as claimed in claim 8 wherein the organic reaction medium is selected from the group consisting of isopropyl alcohol and benzene.

10. A process as claimed in claim 1 wherein the reagent used in step (d) is 1,3-propanesulfone.

11. A process as claimed in claim 1 wherein the reagent used in step (d) is sodium chloroacetate.

12. A process as claimed in claim 1 wherein the reagent used in step (d) is chloroethyl diethylammonium hydrochloride.

13. A process as claimed in claim 1 wherein step (d) is effected to an extent sufficient to provide a cellulosic ion-exchange material having an ion-exchange capacity of up to 2 meq./dry gram.

14. A process as claimed in claim 1 wherein step (d) is effected to an extent sufficient to provide a cellulosic ion-exchange material having an ion-exchange capacity of more than 2 meq./dry gram.

15. A process as claimed in claim 1 wherein there are also introduced into the matrix of the cellulosic material non-ionic substituent groups selected from the group consisting of benzyl, methyl, acetyl and stearyl.

References Cited

UNITED STATES PATENTS

| | | | |
|---|---|---|---|
| 3,226,380 | 12/1965 | Knight | 260—212 |
| 3,208,994 | 9/1965 | Floding | 260—209 |
| 3,061,399 | 10/1962 | Tesoro et al. | 8—120 |
| 3,052,593 | 9/1962 | Battista | 260—212 XR |
| 3,017,237 | 1/1962 | Bullock et al. | 8—120 |

HOSEA E. TAYLOR, JR., *Primary Examiner.*

R. W. MULCAHY, *Assistant Examiner.*

U.S. Cl. X.R.

210—24, 31; 260—231